(12) United States Patent
Miyazaki

(10) Patent No.: US 9,081,257 B2
(45) Date of Patent: Jul. 14, 2015

(54) IMAGING APPARATUS AND LIGHTING CONTROL METHOD

(71) Applicant: CANON KABUSHIKI KAISHA, Tokyo (JP)

(72) Inventor: Yasuyoshi Miyazaki, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/109,187

(22) Filed: Dec. 17, 2013

(65) Prior Publication Data

US 2014/0178059 A1 Jun. 26, 2014

(30) Foreign Application Priority Data

Dec. 26, 2012 (JP) ................... 2012-283670

(51) Int. Cl.
G03B 9/70 (2006.01)
G03B 15/03 (2006.01)
(52) U.S. Cl.
CPC ..................... G03B 15/03 (2013.01)
(58) Field of Classification Search
USPC ........................................ 396/166
See application file for complete search history.

(56) References Cited

U.S. PATENT DOCUMENTS

| 6,272,292 B1* | 8/2001 | Iwasaki et al. ............... 396/157 |
| 8,571,400 B2* | 10/2013 | King .............................. 396/56 |
| 2002/0136551 A1* | 9/2002 | Ishihara et al. ............... 396/161 |
| 2009/0052878 A1* | 2/2009 | Warpakowski Furlan ........ 396/6 |
| 2009/0160944 A1* | 6/2009 | Trevelyan et al. ............. 348/187 |
| 2009/0231468 A1* | 9/2009 | Yasuda ......................... 348/234 |
| 2011/0188845 A1* | 8/2011 | Hanayama et al. ............ 396/155 |
| 2012/0069198 A1* | 3/2012 | Steinberg et al. ............ 348/207.1 |

FOREIGN PATENT DOCUMENTS

JP 2008-219334 A 9/2008

* cited by examiner

Primary Examiner — Rochelle-Ann J Blackman
Assistant Examiner — Linda B Smith
(74) Attorney, Agent, or Firm — Carter, DeLuca, Farrell & Schmidt, LLP

(57) ABSTRACT

An imaging apparatus that uses luminance information obtained through a test flash by a flash unit for illuminating a subject to determine a flash quantity of a flash unit for main photographing sets exposure conditions for the test flash based on exposure conditions for the main photographing. The imaging apparatus changes a predetermined test flash quantity for the test flash to compensate a difference between the set exposure conditions and predetermined initial values of exposure conditions for the test flash and performs the test flash based on the set exposure conditions and the changed test flash quantity.

20 Claims, 6 Drawing Sheets

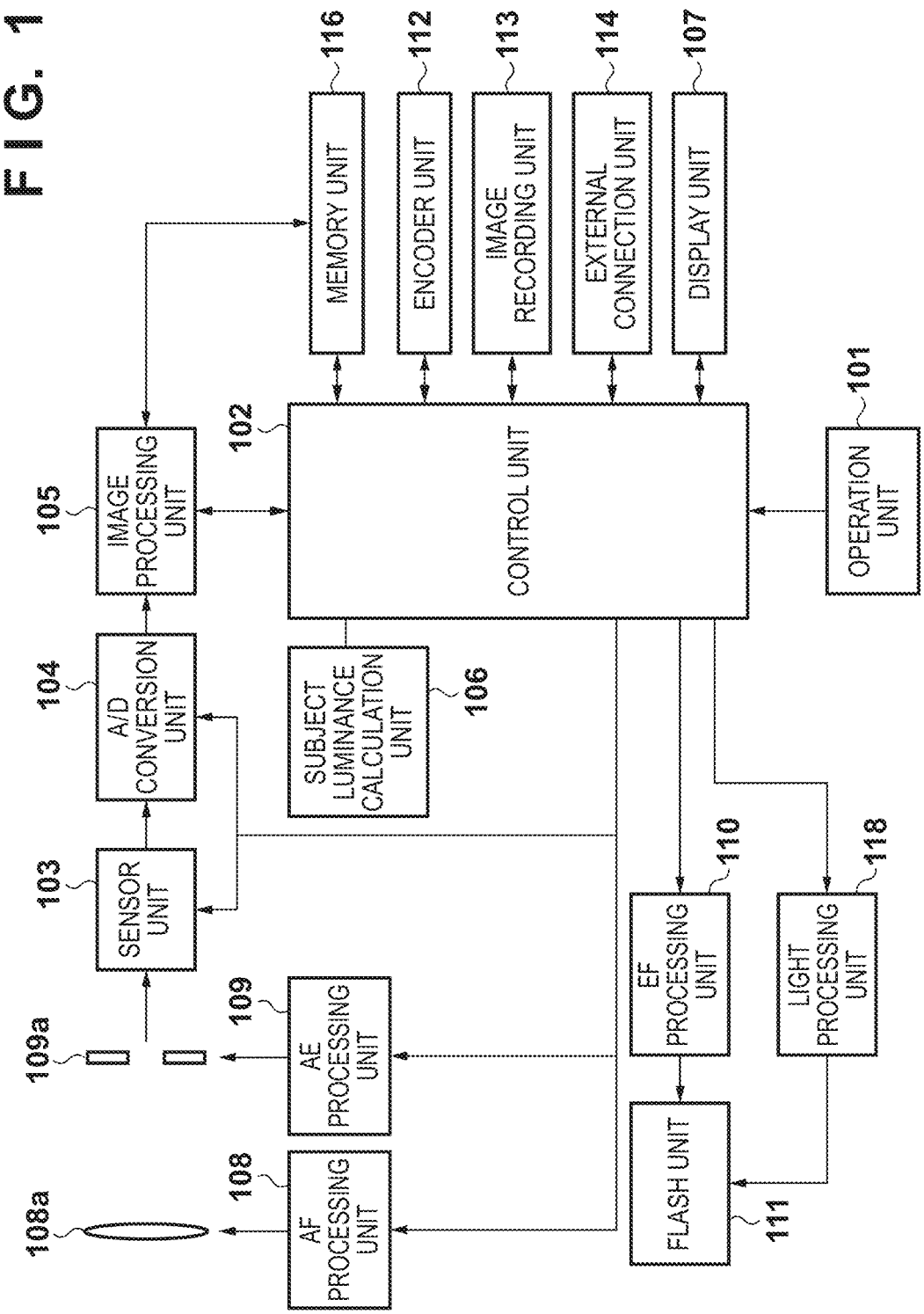

FIG. 3

[EXPOSURE AT LIGHTING CONTROL]
F2.8
SHUTTER 1/60
ISO100
Gno1.0

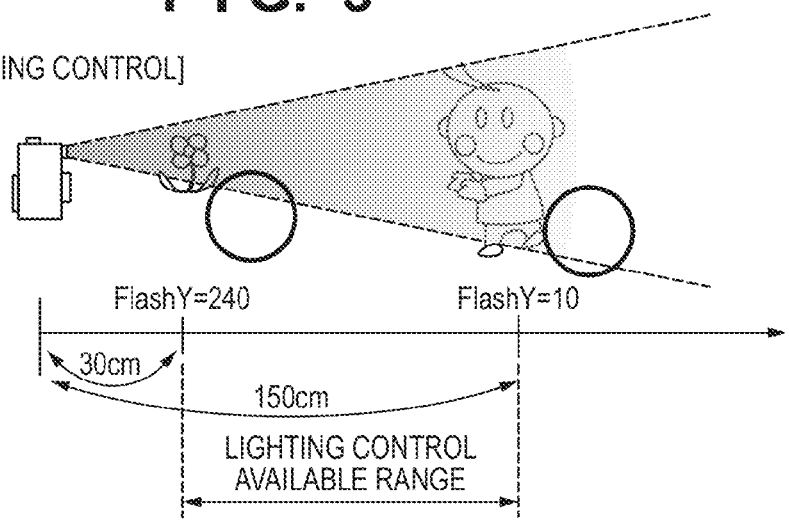

FlashY=240   FlashY=10

30cm

150cm
LIGHTING CONTROL
AVAILABLE RANGE

FIG. 4

[EXPOSURE AT PHOTOMETRY
(EQUIVALENT TO MAIN PHOTOGRAPHING)]
F2.8
SHUTTER 1/2000
ISO100

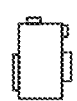 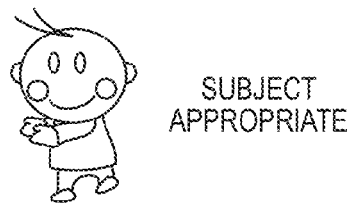

SUBJECT
APPROPRIATE

BEFORE ILLUMINATION : Y120

⇩ FIVE EXPOSURE LEVELS
   IN APEX VALUES

[EXPOSURE AT INITIAL LIGHTING CONTROL]
F2.8
SHUTTER 1/60
ISO100

 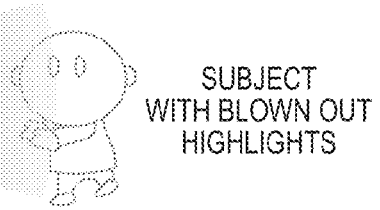

SUBJECT
WITH BLOWN OUT
HIGHLIGHTS

BEFORE ILLUMINATION : Y255 ⎫ FLASH
REFLECTION LUMINANCE : Y255 ⎭ LUMINANCE Δy0

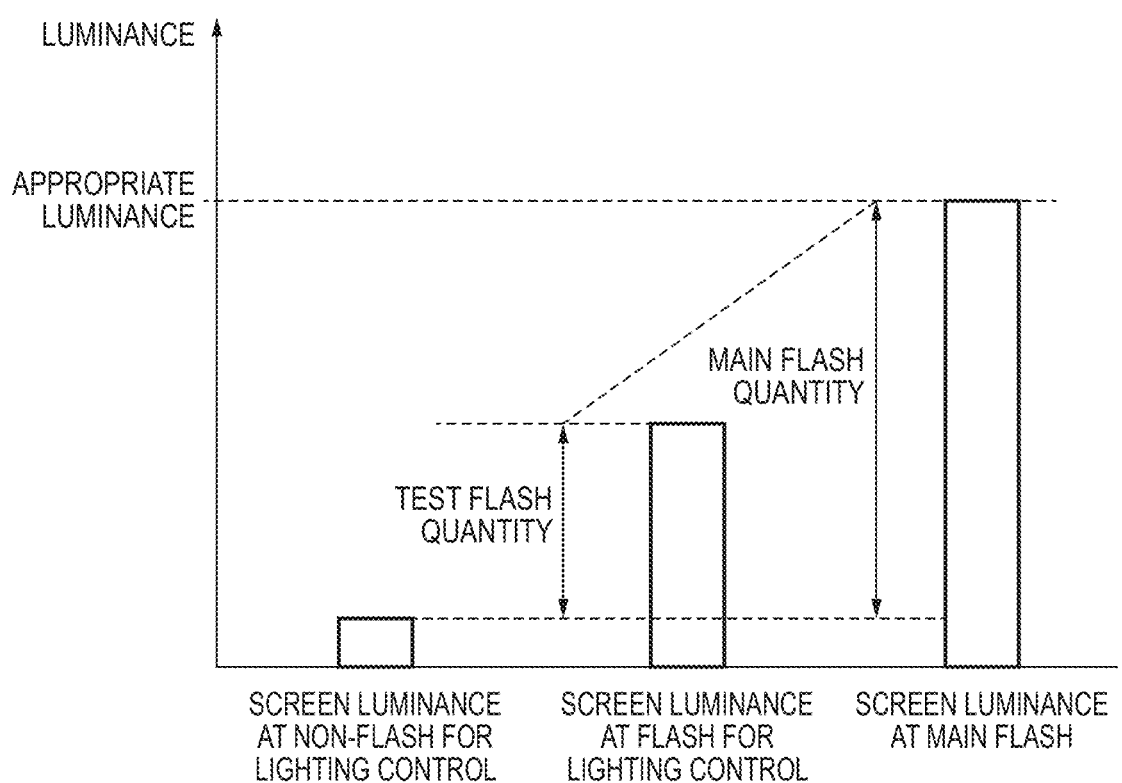

IMAGING APPARATUS AND LIGHTING CONTROL METHOD

BACKGROUND OF THE INVENTION

1. Field of the Invention

The present invention relates to an imaging apparatus capable of photographing using a stroboscope apparatus and to a lighting control method of the imaging apparatus.

2. Description of the Related Art

In general, a test flash system for performing a test flash (pre-flash) for lighting control before a main flash to measure reflected light of a subject in advance and calculating a main flash quantity from the measurement result is known as a lighting control system, for a stroboscope apparatus using a xenon tube. A test flash quantity is preset in initially set exposure (for example, aperture value F2.8, shutter speed 1/60, and ISO 100) so that a desired light quantity reaches a predetermined distance (FIG. 3).

Japanese Patent Laid-Open No. 2008-219334 describes a configuration in lighting control using a test flash, wherein the distance from the subject is taken into account to adjust the sensitivity at the test flash to reduce arithmetic errors of exposure.

Meanwhile, if the exposure at the test flash is deviated too much from the exposure at the main flash, the effect on the subject by the ambient light may be changed, and the lighting control accuracy may be affected. For example, in a scene in which the exposure at the main flash is set to F2.8, shutter speed 1/2000, and ISO 100 as in FIG. 4, blown out highlights may occur in the subject at the exposure with the initial setting described above, even without the illumination by the test flash. If the blown out highlights occur in the subject, the subject is always overexposed, and an appropriate reflection luminance is not obtained by the test flash (no luminance difference before and after the test flash). Therefore, it is desirable to set the exposure at the test flash to about the same level as the exposure at the main flash in order to maintain the accuracy of lighting control calculation.

However, if the exposure at the test flash is different from the exposure at the initial setting, the reflection luminance may turn out to be higher or lower with the preset test flash quantity as shown in FIGS. 5B and 5C, and proper lighting control is not performed for the subject in some cases. The light quantities of the test flash and the main flash are correlated in a xenon tube, and a main flash table needs to be included for each flash quantity of the test flash. Therefore, a plurality of corresponding main flash tables need to be held to allow performing the test flash based on a plurality of types of flash quantity. However, it is difficult in reality to hold the plurality of main flash tables, due to the memory capacity of the imaging apparatus. More specifically, it is not realistic to apply a plurality of types of flash quantity to the test flash in an imaging apparatus using a stroboscope apparatus including a xenon tube as a light source.

SUMMARY OF THE INVENTION

In view of the problems, the embodiments of the present invention disclose an imaging apparatus and a lighting control method that allow proper lighting control in various scenes.

According to one aspect of the present invention, there is provided an imaging apparatus comprising: an acquisition unit configured to acquire information related to a luminance of a subject; a main flash quantity determination unit configured to determine a main flash quantity of a flash apparatus based on the information related to the luminance of the subject when the flash apparatus pre-flashes, the information acquired by the acquisition unit; an exposure determination unit configured to determine an exposure control value used when the flash apparatus pre-flashes, based on the information related to the luminance of the subject when the flash apparatus does not flash, the information acquired by the acquisition unit; and a pre-flash quantity determination unit configured, to determine a pre-flash quantity of the flash apparatus based on the exposure control value determined by the exposure determination unit.

Also, according to another aspect of the present invention, there is provided an imaging apparatus comprising: an acquisition unit configured to acquire information related to a luminance of a subject; a main flash quantity determination unit configured, to determine a main flash quantity of a flash apparatus based on the information related to the luminance of the subject when the flash apparatus pre-flashes, the information acquired by the acquisition unit; an exposure determination unit configured to determine an exposure control value used when the flash apparatus preflashes, based on the information related to the luminance of the subject when the flash apparatus does not flash, the information acquired by the acquisition unit; and a pre-flash quantity determination unit configured to determine a pre-flash quantity of the flash apparatus to bring a lighting control range of the flash apparatus into line with a target range when the exposure control value determined by the exposure determination unit is used.

Also, according to another aspect of the present invention, there is provided a lighting control method of an imaging apparatus, the lighting control method comprising: an acquisition step of acquiring information related to a luminance of a subject; a main flash quantity determination step of determining a main flash quantity of a flash apparatus based on the information related to the luminance of the subject when the flash apparatus pre-flashes, the information acquired in the acquisition step; an exposure determination step of determining an exposure control value used when the flash apparatus pre-flashes, based on the information related to the luminance of the subject when the flash apparatus does not flash, the information acquired in the acquisition step; and a pre-flash quantity determination step of determining a pre-flash quantity of the flash apparatus based on the exposure control value determined in the exposure determination step.

Furthermore, according to another aspect of the present invention, there is provided a lighting control method of an imaging apparatus, the light control method comprising: an acquisition step of acquiring information related to a luminance of a subject; a main flash quantity determination step of determining a main flash quantity of a flash apparatus based on the information related to the luminance of the subject when the flash apparatus pre-flashes, the information acquired in the acquisition step; an exposure determination step of determining an exposure control value used when the flash apparatus pre-flashes, based on the information related to the luminance of the subject when the flash apparatus does not flash, the information acquired in the acquisition step; and a pre-flash quantity determination step of determining a preflash quantity of the flash apparatus to bring a lighting control range of the flash apparatus into dine with a target range when the exposure control value determined in the exposure determination step is used.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodi- FIG. 1 is a block diagram of an imaging apparatus according to embodiments.

FIG. 3 is a diagram describing a reach distance of a test flash.

FIG. 4 is a diagram describing a subject illuminance difference caused by an exposure difference.

FIG. 6 is a diagram describing a calculation method of a flash quantity.

DESCRIPTION OF THE EMBODIMENTS

Figure 2A:
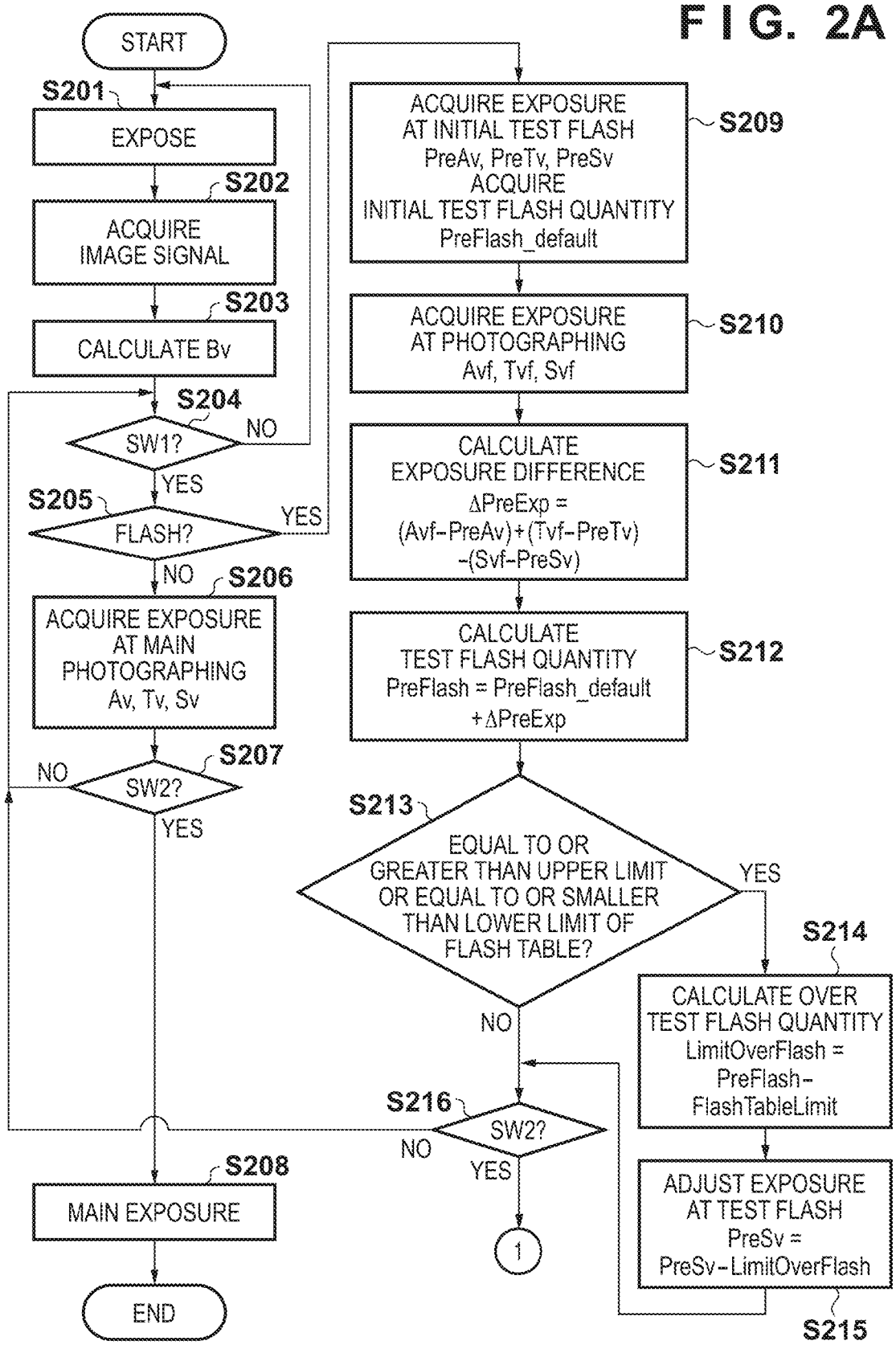
FIGS. 2A and 2B are flow charts showing a flow of a process by the imaging apparatus according to the embodiments.

Preferred embodiments of the present invention will now be described in detail with reference to the attached drawings.

FIG. 1 is a block diagram showing a functional configuration example of a digital camera according to the embodiments of the present invention. A configuration of an imaging apparatus and a flow of a process according to the embodiments of the present invention will be described with reference to FIG. 1.

<Configuration of Imaging Apparatus (Digital Camera)>

An operation unit 101 includes switches, buttons, and the like operated by an operator of the digital camera to input various instructions to the digital camera. The operation unit 101 also includes a shutter switch and a touch sensor (allows operation by touching a display device). A control unit 102 is configured to control the entire operation of the digital camera shown in FIG. 1, and the control unit 102 controls the components according to instructions from the operation unit 101.

A sensor unit 103 includes an imaging element, such as a CCD and a CMOS sensor. The sensor unit 103 receives light entering through a lens 108a and a mechanical mechanism 109a and stores the charge according to the light quantity to output an image signal. An A/D conversion unit 104 performs sampling, gain adjustment, A/D conversion, and the like for an analog image signal output from the sensor unit 103 and outputs a digital image signal. An image processing unit 105 applies various image processing to the digital image signal output from the A/D conversion unit 104 and outputs the processed digital image signal. For example, the image processing unit 105 converts the digital image signal received from the A/D conversion unit 104 to a YUV image signal and outputs the YUV image signal. A memory unit 116 forms an internal memory and stores an image after the image processing.

A subject luminance calculation unit 106 calculates a subject luminance based on the image signal obtained by the image processing unit 105. Part or all of the components, such as the image processing unit 105 and the subject luminance calculation unit 106, may be functions realized by the control unit 102 executing predetermined programs. A display unit 107 includes a liquid crystal screen or the like and performs various displays under the control of the control unit 102. An AF processing unit 108 controls the lens 108a based on the image obtained by the image processing unit 105 and adjusts the focus. An AE processing unit 109 calculates a difference between the subject luminance calculated by the subject luminance calculation unit 106 and a proper luminance and controls the mechanical mechanism 109a. An EF processing unit 110 flashes a flash unit 111 at a light quantity that can make the subject luminance proper when a flash determination is made. The flash unit 111 is a stroboscope apparatus including an LED as a light source. The flash unit 111 may be embedded in the main body of the digital camera or may be removable.

A light processing unit 118 instructs the flash unit 111 to continuously light up in video recording. The light processing unit 118 makes a flash determination based on whether an outside light luminance (subject luminance when the flash unit 111 is not flashed) is equal to or smaller than a predetermined luminance. The light processing unit 118 instructs the continuous lighting when the outside light luminance is equal to or smaller than the predetermined luminance. A current value transmitted to the flash unit 111 at the continuous lighting is set to a value lower than the value at a still image flash in order to alleviate an increase in the temperature by heat. The light processing unit 118 turns on the flash unit 111 to support the subject illuminance when it is determined to be dark and turns off the flash unit 111 at a luminance that does not require the light. To prevent frequent repetition of the lighting and the extinction, a hysteresis based on the luminance level is arranged for the lighting luminance and the extinction luminance. The flash unit 111 may be used as a flash unit that generates AF auxiliary light.

An encoder unit 112 converts the format of the output digital image signal (image data) to a format such as JPEG and outputs the signal to an image recording unit 113. The image recording unit 113 records the image data in the converted format received from the encoder unit 112 in a memory (not shown) in the digital camera or in an external memory inserted to the digital camera. An external connection unit 114 is an interface for connecting and communicating with an external apparatus such as a personal computer.

<Flow of Control of Photographing>

Operation of using the digital camera with the configuration described above to perform imaging will be described.

When the operator of the digital camera turns on a power switch included in the operation unit 101, the control unit 102 detects this and supplies power to the components included in the digital camera. Once the power is supplied to the components included in the digital camera, the shutter of the mechanical mechanism 109b opens, and light enters the sensor unit 103 through the lens 108a and the mechanical mechanism 109b arranged on the front surface of the camera. The sensor unit 103 reads the charge accumulated on the sensor according to the light quantity and outputs an analog image signal to the A/D conversion unit 104.

The A/D conversion unit 104 performs sampling, gain adjustment, A/D conversion, and the like for the analog image signal output from the sensor unit 103 and outputs a digital image signal. The image processing unit 105 applies various image processing to the digital image signal output from the A/D conversion unit 104 and outputs the processed digital image signal.

When the control unit 102 receives a notification of a signal (hereinafter, "SW1") by half-press of the photographing button from the shutter switch, the control unit 102 uses the image signal at this point to execute an AF process and an AE process to acquire a focus and exposure setting conditions optimal for photographing. The control unit 102 also determines whether to flash the stroboscope (hereinafter, "stroboscope flash determination") when the SW1 is turned on. A well-known method can be used for the stroboscope flash determination.

When it is determined, not to flash the stroboscope in the stroboscope flash determination, there is an immediate transition to main photographing once a notification of a signal (hereinafter, "SW2") by full-press of the photographing button is received from the shutter switch. More specifically, the control unit 102 notifies the AE processing unit 109 and the AF Processing unit. 108 of the photographing conditions set when the SW1 is turned on and sets the lens 108a and the mechanical mechanism 109a. The sensor unit 103 reads the charge stored according to the light reached through the lens 108a and the mechanical mechanism 109a and outputs an analog image signal to the A/D conversion unit 104.

The A/D conversion unit 104 performs sampling, gain adjustment, A/D conversion, and the like for the analog image signal output from the sensor unit 103 and outputs a digital image signal. The image processing unit 105 applies various image processing to the digital image signal output from the A/D conversion unit 104 and outputs the processed digital image signal.

When it is determined to flash the stroboscope in the stroboscope flash determination, there is a transition to main photographing associated with lighting control by a test flash (pre-flash) according to ON of the SW2. More specifically, the photographing conditions set when the SW1 is turned on are transmitted to the AE processing unit 109 and the AF processing unit 108, and non-flash image data for lighting control without the flash of the flash unit 111 is first acquired. The EF processing unit 110 outputs an instruction of the test flash to the flash unit 111 and acquires image data for lighting control that is image data under the test flash. The luminance difference between the acquired non-flash image data and image data for lighting control is used to calculate a flash quantity (main flash quantity) for the main flash by the flash unit 111 that is necessary to set a proper luminance for the subject in the main photographing.

Once the main flash quantity is calculated, main flash photographing is performed. More specifically, under the control of the control unit 102, the EF processing unit 110 outputs an instruction (main flash instruction) of the flash based on the calculated main flash quantity to the flash unit 111 to flash the flash unit 111. The sensor unit 103 reads the charge from the reflected light in the main flash reached through the lens 108a and the mechanical mechanism 109a (exposure mechanism) and outputs an analog image signal to the A/D conversion unit 104.

The A/D conversion unit 104 performs sampling, gain adjustment, A/D conversion, and the like for the analog image signal output from the sensor unit 103 and outputs a digital image signal. Control of the test flash quantity at the lighting control will be described later. The encoder unit 112 converts the digital image signal output from the image processing unit 105 to a format such as JPEG and outputs the signal to the image recording unit 113. The image recording unit 113 executes a process of recording the image data in the converted format in a predetermined memory (for example, the memory unit 116).

<Description of Lighting Control Process>

Figure 2B:
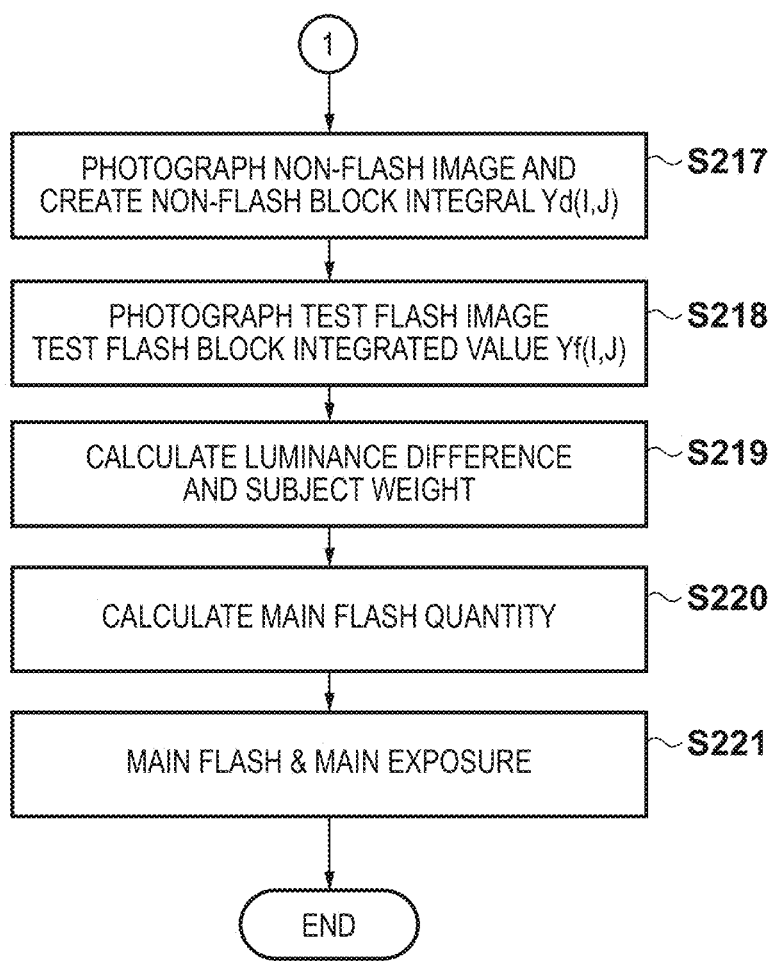

A lighting control process at the stroboscope flash according to the present embodiment will be described. FIGS. 2A and 2B are a flow chart showing details of the control of photographing.

When the power switch included in the operation unit 101 is turned on, the control unit 102 sets an initial exposure value to start the exposure (step S201) and reads an exposed image signal from the sensor unit 103 (step S202). The control unit 102 calculates a luminance value Bv of the image as luminance information related to the luminance of the subject from the image signal read from the sensor unit 103 (step S203). In the present embodiment, the screen is divided into blocks, and the luminance values are integrated block-by-block. The block integration is used to calculate a screen average luminance to use the screen average luminance as the luminance value Bv. However, other methods may be used. The display unit 107 displays the image based on the read image signal, and the image to be displayed is sequentially updated every time a new image is obtained. The exposure is repeated until the SW1 is pressed (S204).

If ON of the SW1 is detected (YES in S204), the control unit 102 makes a stroboscope flash determination (S205). If "non-flash" is determined in the stroboscope flash determination (NO in S205), the Bv value as the luminance information acquired in S203 is used to calculate photographing exposure for non-flash (aperture Av, shutter speed Tv, and ISO sensitivity Sv) (S206). In the present embodiment, APEX values are used as an example of the unit of the aperture, the shutter speed, and the ISO sensitivity for calculating the exposure. In the photographing exposure of the stroboscope non-flash photographing, the ISO sensitivity, the aperture, the shutter speed, and the like are determined based on the Bv value to attain proper exposure for the photographed image. Consequently, when the SW2 is turned on, the control unit 102 performs the main exposure (photographing) based on the exposure conditions determined in S206 (S208).

Figure 5A:
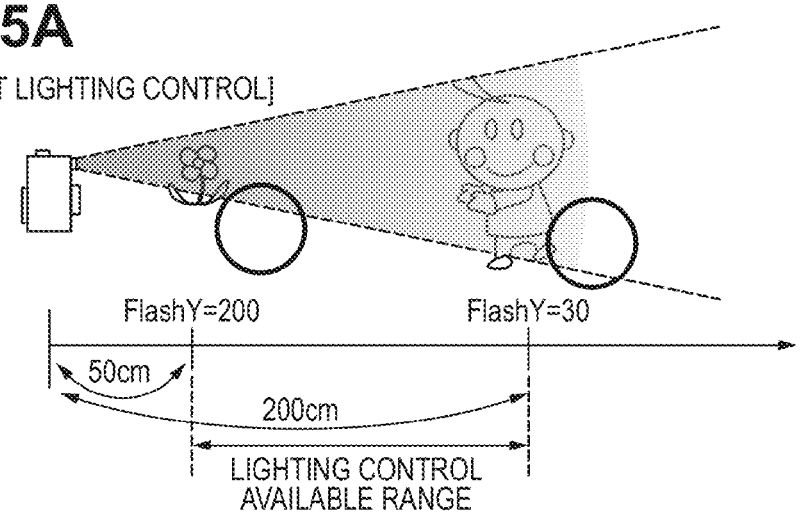
FIGS. 5A to 5C are diagrams showing differences in the reach distance of the test flash caused by exposure differences.
Figure 5B:
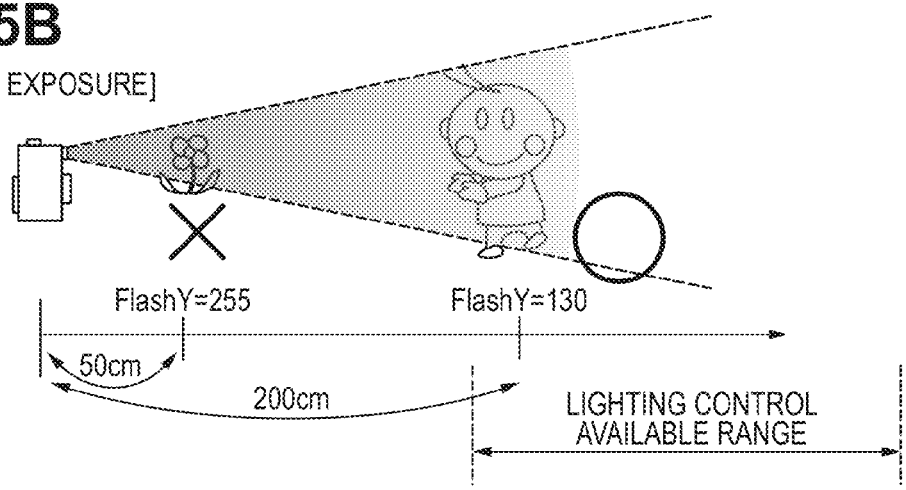
Figure 5C:
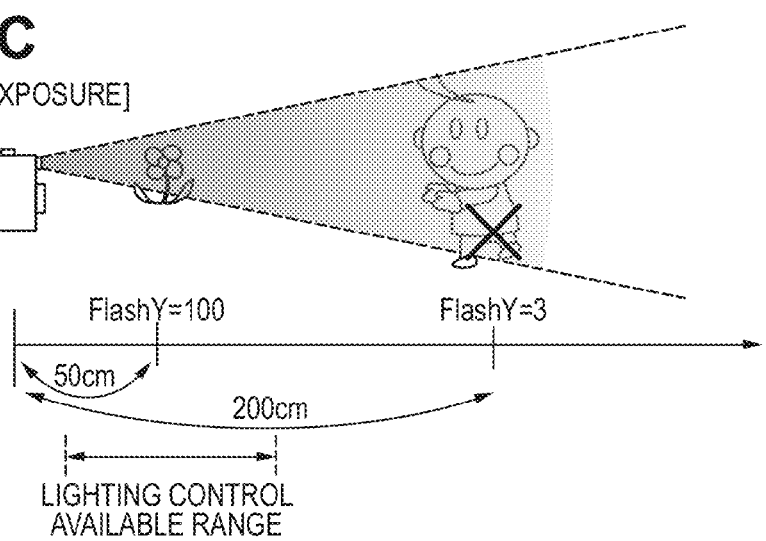

On the other hand, if "flash" is determined in the stroboscope flash determination of S205, the control unit 102 acquires an initial test flash quantity (PreFlash default) held in the digital camera and initial test flash exposure (PreAv, PreTv, and PreSv) as initial values of the exposure conditions for the test flash (S209). The initial test flash quantity and the initial test flash exposure are exposure and test flash quantity based on reflection luminance (JPEG reflection luminance Y200 at 50 cm, JPEG reflection luminance 130 at 200 cm) that can maintain the lighting control accuracy relative to a predetermined distance (50 cm to 200 cm), for example. FIG. 5A illustrates this state. The predetermined distance and the reflection luminance are based on the design concept of each imaging apparatus, and the values are not limited to the values described above.

The control unit 102 uses the Bv value that is the luminance information acquired in S203 to calculate photographing exposure (Avf, Tvf, and Svf) for test flash (S210). The control unit 102 calculates a difference $\Delta PreExp$ between the obtained photographing exposure and initial test flash exposure by the following Expression 1 (S211).

$$\Delta PreExp = (Avf - PreAv) + (Tvf - PreTv) - (Svf - PreSv) \quad \text{(Expression 1)}$$

Although an appropriate reflection luminance can be obtained for the subject at the assumed distance if there is no exposure difference $\Delta PreExp$ or if the exposure difference $\Delta PreExp$ is small, an appropriate reflection luminance may not be obtained if the exposure difference is large. Therefore, the control unit 102 uses a flash quantity $f(\Delta PreExp)$ equivalent to the exposure difference $\Delta PreExp$ as an amount of change to an initial test flash quantity PreFlash default as indicated by Expression 2 to calculate the test flash quantity PreFlash flat can obtain a desired reflection luminance for the subject in a predetermined lighting control range (S212). The flash quantity $f(\Delta PreExp)$ equivalent to the exposure difference $\Delta PreExp$ can be held in advance in a table.

$$PreFlash = PreFlash\ default + f(\Delta PreExp) \quad \text{(Expression 2)}$$

As a result of changing the test flash quantity, if the changed flash quantity exceeds an upper limit or a lower limit. (FlashTableLimit) of the flash table (YES in S214), the over or under flash quantity (LimitOverFlash) is calculated as in Expression 3 (S214). The over or under flash quantity (LimitOverFlash) is compensated by adjustment of the exposure conditions (aperture value, sensitivity, and shutter speed) (S215). For example, the sensitivity PreSv at the test flash is adjusted to compensate the excess or deficient flash intensity as indicated by Expression 4 to maintain the lighting control range.

$$LimitOverFlash = PreFlash - FlashTableLimit \quad \text{(Expression 3)}$$

$$PreSv = PreSv - g(LimitOverFlash) \quad \text{(Expression 4)}$$

In Expression 4, g(LimitOverFlash) denotes an exposure value corresponding to the light quantity LimitOverFlash exceeding the set range and is held in advance, in the memory unit 116 in a format of a table or the like.

If the SW2 is pressed in this state, there is a transition to lighting control using the control value (YES in S216). In order to calculate a necessary main flash quantity, the control unit 102 acquires the non-flash image data for lighting control and the test flash image data for lighting control and divides the non-flash image data and the test flash image data into blocks to calculate each block luminance (S217 and S218). The block luminance of a block (I, J) of the non-flash image data will be defined as Yd(I, J), and the block luminance of a block (I, J) of the test flash image data will be defined as Yf(I, J). A luminance difference between corresponding luminance blocks is calculated, and the value of the luminance difference between the blocks is weighted and calculated to obtain a value (S219). In this case, a subject area in which the reflected light quantity based on the test flash exceeds a predetermined value may be cut out from the luminance difference between the non-flash image data for lighting control and the test flash image data for lighting control, and the weight of the cut subject area may be greater than the other areas. The main flash quantity necessary to obtain a proper screen luminance at the main flash is calculated from the obtained value (S220). For example, the flash quantity deficient in the test flash quantity is added to the test flash quantity to calculate the main flash quantity as illustrated in FIG. 6. The control unit 102 drives the flash unit 111 by the main flash quantity calculated in S220 and uses the photographing exposure (Avf, Tvf, and Svf) calculated in S210 to perform photographing to execute the main flash and the main photographing (S221).

As described, the flash quantity deficient at the test flash is basically added to the test flash quantity to set the flash quantity of the main flash. However, when there is a subject with a high reflectance, blown out highlights may occur if the flash quantity is simply added. Therefore, when the image data obtained by the photographing based on the test flash includes an area with the luminance value exceeding a predetermined threshold, the main flash quantity may be calculated by subtracting the luminance value exceeding the threshold from the flash quantity to be added.

When the calculated main flash quantity is smaller than a limit value on the down side (lower limit value) of the configurable range of the flash unit 111, the main flash quantity is limited by the lower limit value, and blown out highlights may occur. To prevent the blown out highlights, exposure equivalent to the flash quantity of the blown out highlights (for example, difference between the calculated flash quantity and the lower limit value) may be subtracted from the exposure at the main flash to set exposure for preventing the blown out highlights to perform the main flash. In the setting of the exposure for preventing the blown out highlights, the aperture and the gain (sensitivity) can be adjusted to be dark, or the shutter speed can be increased. In the present embodiment, the gain is preferentially adjusted to be darker.

Conversely, when the calculated main flash quantity exceeds a limit value on the upside (upper limit value) of the configuration range of the flash unit 111, the main flash quantity may be limited by the upper limit value, and under exposure may occur. To prevent the under exposure, exposure equivalent to the flash quantity of the under exposure (for example, difference between the calculated flash quantity and the upper limit value) may be added to the exposure at the main flash to set the exposure to perform the main flash. Examples of a method of preventing the under exposure include adjusting the aperture and the gain (sensitivity) to brighten up as well as reducing the shutter speed.

As described, when the flash unit 111 cannot perform the main flash at a flash quantity appropriate for the subject based on the photographing exposure calculated in S210, the photographing exposure is changed from the value calculated in S210 to allow the flash unit 111 to perform the main flash at the flash quantity appropriate for the subject.

In the present embodiment, the light processing unit 118 can cause the flash unit 111 to be used as a light capable of continuous lighting in video recording. In this case, it is preferable than the current value used for the video light be smaller than the value used in the still image stroboscope. When the light is turned on in the video recording, red eyes may be detected from the obtained image. If there are red eyes, the flash quantity may be reduced, and the deficient flash quantity may be complemented by the aperture, the sensitivity, and the shutter speed to obtain a proper luminance.

According to the embodiments, the light source (for example, LED light) with proportionality in the flash quantity and the set current value can also be utilized to use the exposure conditions at the main flash in the lighting control to change the test flash quantity according to the exposure conditions. In this way, the test flash quantity can be changed from a predetermined value according to the exposure at the main flash to prevent degradation in the lighting control accuracy caused by blown out highlights or under exposure of the subject and to perform proper lighting control in various scenes.

Although the preferred embodiments of the present invention have been described, the present invention is not limited to the embodiments, and the present invention includes designs and the like, within the scope of the invention.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device. (e.g., computer-readable storage medium).

While the present invention has been described, with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-283670, filed Dec. 26, 2012, which is hereby incorporated, by reference herein in its entirety.

What is claimed is:

1. An imaging apparatus comprising:
   an acquisition unit configured to acquire information related to a luminance of a subject;
   a main flash quantity determination unit configured to determine a main flash quantity of a flash apparatus based on information related to the luminance of the subject, which is acquired by the acquisition unit in a state where the flash apparatus is pre-flashing;
   an exposure determination unit configured to determine an exposure control value used when the flash apparatus pre-flashes, based on information related to the luminance of the subject, which is acquired by the acquisition unit in a state where the flash apparatus does not flash; and
   a pre-flash quantity determination unit configured to determine a pre-flash quantity of the flash apparatus based on the exposure control value determined by the exposure determination unit, before the flash apparatus pre-flashes.

2. The apparatus according to claim 1, wherein the pre-flash quantity determination unit is configured to determine the pre-flash quantity based on a difference between the exposure control value determined by the exposure determination unit and a reference exposure control value.

3. The apparatus according to claim 1, wherein the pre-flash quantity determination unit is configured to set the pre-flash quantity by changing a reference flash quantity by an amount of a flash quantity corresponding to the difference between the exposure control value determined by the exposure determination unit and a reference exposure control value.

4. The apparatus according to claim 1, wherein if the pre-flash quantity determined by the pre-flash quantity determination unit is greater than a predetermined upper limit value, the exposure determination unit is configured to change the determined exposure control value to reduce exposure according to the flash quantity greater than the upper limit value.

5. The apparatus according to claim 1, wherein if the pre-flash quantity determined by the pre-flash quantity determination unit is smaller than a predetermined lower limit value, the exposure determination unit is configured to change the determined exposure control value to increase exposure according to the flash quantity smaller than the lower limit value.

6. The apparatus according to claim 1, wherein the exposure determination unit is configured to determine the exposure control value used when the flash apparatus main-flashes, to bring the exposure control value into line with the exposure control value used when the flash apparatus pre-flashes.

7. The apparatus according to claim 3, wherein the reference flash quantity is a flash quantity that brings a lighting control range of the flash apparatus into line with a target range when the reference exposure control value is used.

8. An imaging apparatus comprising:
   an acquisition unit configured to acquire information related to a luminance of a subject;
   a main flash quantity determination unit configured to determine a main flash quantity of a flash apparatus based on information related to a luminance of the subject acquired by the acquisition unit in a state where the flash apparatus is pre-flashing;
   an exposure determination unit configured to determine an exposure control value used when the flash apparatus pre-flashes, based on information related to a luminance of the subject acquired by the acquisition unit in a state where the flash apparatus does not flash; and
   a pre-flash quantity determination unit configured to determine a pre-flash quantity of the flash apparatus to bring a lighting control range of the flash apparatus into line with a target range when the exposure control value determined by the exposure determination unit is used, before the flash apparatus pre-flashes.

9. The apparatus according to claim 8, wherein the lighting control range indicates a subject distance that allows the main flash quantity determination unit to determine the main flash quantity of the flash apparatus based on information related to a luminance of the subject acquired by the acquisition unit in a state where the flash apparatus is pre-flashing.

10. The apparatus according to claim 8, wherein the pre-flash quantity determination unit is configured to determine the pre-flash quantity based on the exposure control value determined by the exposure determination unit.

11. The apparatus according to claim 8, wherein the pre-flash quantity determination unit is configured to determine the pre-flash quantity based on a difference between the exposure control value determined by the exposure determination unit and a reference exposure control value.

12. The apparatus according to claim 8, wherein the pre-flash quantity determination unit is configured to set the pre-flash quantity by changing a reference flash quantity by a flash quantity corresponding to a difference between a reference exposure control value, and the exposure control value determined by the exposure determination unit.

13. The apparatus according to claim 12, wherein the reference flash quantity is a flash quantity that brings the lighting control range into line with the target range when the reference exposure control value is used.

14. The apparatus according to claim 8, wherein the exposure determination unit is configured to determine the exposure control value used when the flash apparatus main-flashes, to bring the exposure control value into line with the exposure control value used when the flash apparatus pre-flashes.

15. The apparatus according to claim 8, wherein in a case that the pre-flash quantity determined by the pre-flash quantity determination unit is greater than a predetermined upper limit value, the exposure determination unit is configured to change the determined exposure control value to bring a range of the subject distance that allows lighting control of the flash apparatus into line with a predetermined range, according to the flash quantity greater than the upper limit value.

16. The apparatus according to claim 8, wherein in a case that the pre-flash quantity determined by the pre-flash quantity determination unit is smaller than a predetermined lower limit value, the exposure determination unit is configured to change the determined exposure control value to bring a range of the subject distance that allows lighting control of the flash apparatus into line with a predetermined range, according to the flash quantity smaller than the lower limit value.

17. A lighting control method of an imaging apparatus, the lighting control method comprising:
   determining a main flash quantity of a flash apparatus based on information related to a luminance of a subject, which is acquired in a state where the flash apparatus is pre-flashing;
   determining an exposure control value used when the flash apparatus pre-flashes, based on the information related to a luminance of the subject, which is acquired in a state where the flash apparatus does not flash; and determining a pre-flash quantity of the flash apparatus based on the determined exposure control value, before the flash apparatus pre-flashes.

18. A lighting control method of an imaging apparatus, the lighting control method comprising:

determining a main flash quantity of a flash apparatus based on information related to a luminance of a subject, which is acquired in a state where the flash apparatus is pre-flashing;

determining an exposure control value used when the flash apparatus pre-flashes, based on information related to a luminance of the subject, which is acquired in a state where the flash apparatus does not flash; and determining a pre-flash quantity of the flash apparatus to bring a lighting control range of the flash apparatus into line with a target range when the determined exposure control value is used, before the flash apparatus pre-flashes.

19. A non-transitory computer readable storage medium storing programs for causing a computer to execute the steps of the lighting control method according to claim 17.

20. A non-transitory computer readable storage medium storing programs for causing a computer to execute the steps of the lighting control method according to claim 18.

* * * * *